A. GREINER.
OPTICAL INSTRUMENT.
APPLICATION FILED MAY 1, 1918.
1,324,448.
Patented Dec. 9, 1919.
2 SHEETS—SHEET 1.
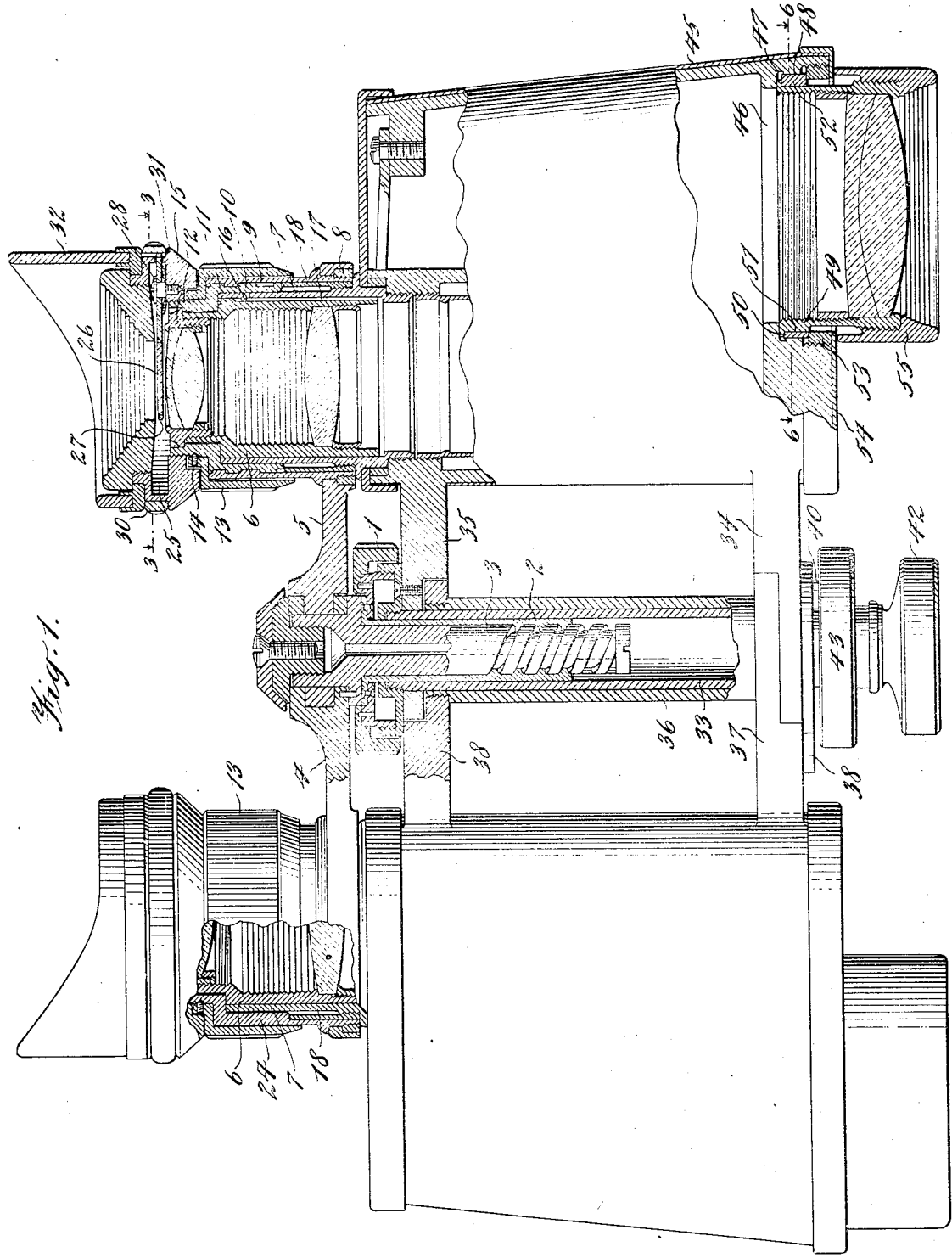
INVENTOR.
Arno Greiner
BY
Rosenbaum, Stockbridge & Borst
ATTORNEYS

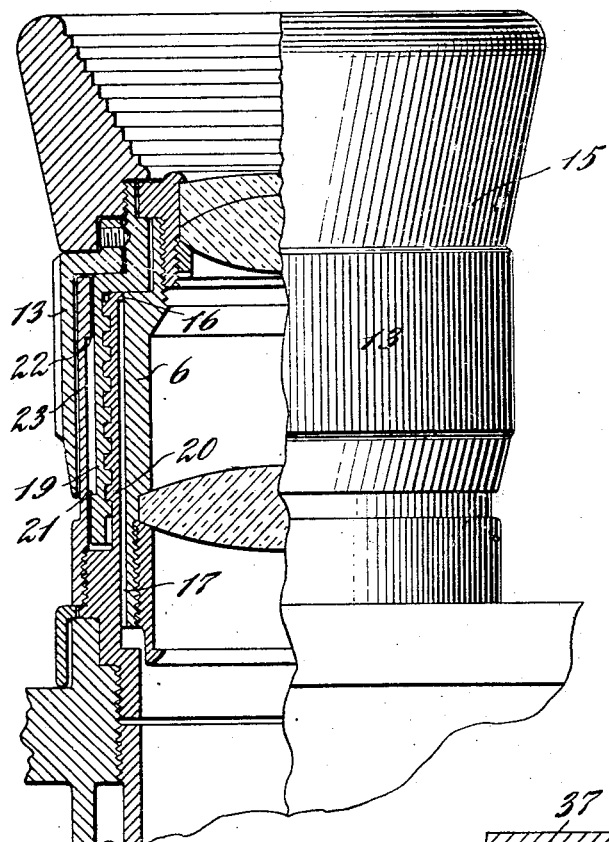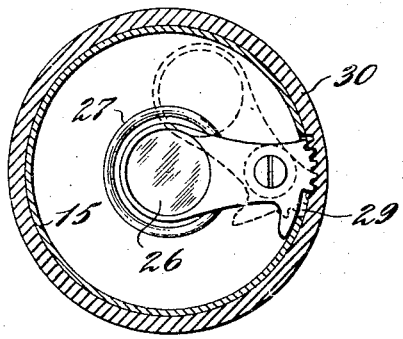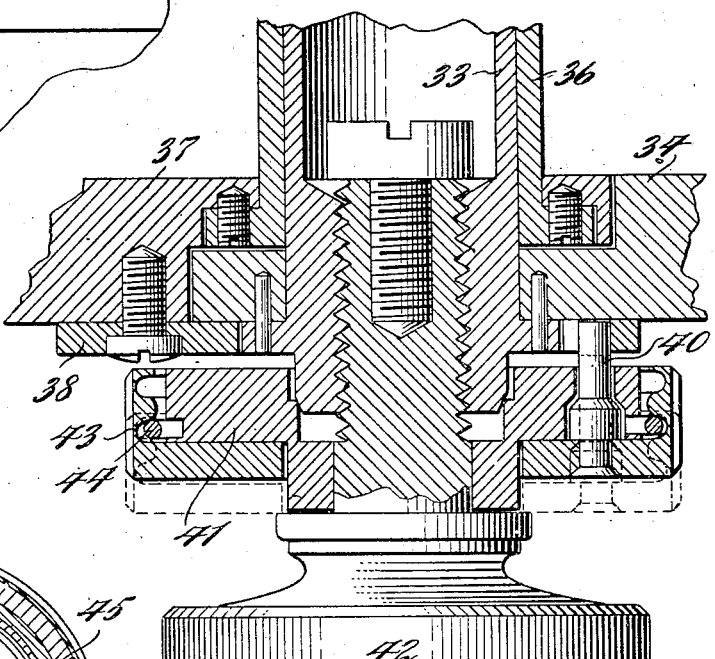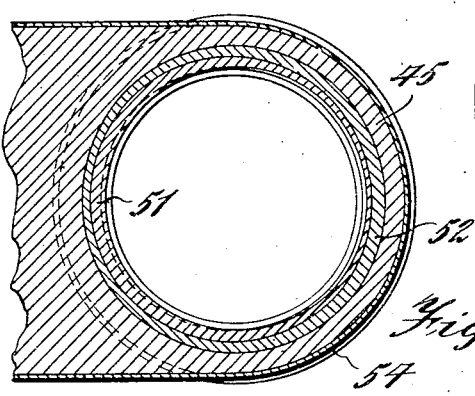

UNITED STATES PATENT OFFICE.

ARNO GREINER, OF MOUNT VERNON, NEW YORK, ASSIGNOR TO GENERAL OPTICAL COMPANY, A CORPORATION OF NEW YORK.

OPTICAL INSTRUMENT.

1,324,448.      Specification of Letters Patent.      Patented Dec. 9, 1919.

Application filed May 1, 1918. Serial No. 231,856.

*To all whom it may concern:*

Be it known that I, ARNO GREINER, a subject of the Emperor of Germany, residing at Mount Vernon, in the county of Westchester and State of New York, have invented certain new and useful Improvements in Optical Instruments, of which the following is a full, clear, and exact description.

My invention relates to optical instruments, such as telescopes, field glasses and the like, and certain features of my invention relate more particularly to binocular instruments.

An object of my invention is to provide an independently adjustable eyepiece construction in which the adjustment of the eyepiece lenses for focal adjustment is effected without rotative movement of the lenses, and which combines simplicity, rigidity and durability of construction with accuracy of operation and neatness of appearance. Another object is to provide a ray filter construction which may be conveniently operated in any rotative position of the eyepiece. Another object is to provide an improved pupilary distance locking device for hinged binocular instruments which will be positive in its action, convenient to operate, and of durable construction. Another object is to provide a simplified and improved objective lens mounting. Still other objects and advantages of my invention will appear from the following description.

I shall now describe the illustrated embodiment of my invention and shall thereafter point out my invention in claims.

Figure 1 is a partial elevation and a partial central vertical section of a complete binocular instrument of the universal adjustment type and embodying my invention;

Fig. 2 is a partial elevation and partial section of an eyepiece, illustrating one application of my invention to an instrument of the non-universal type;

Fig. 3 is a horizontal sectional detail taken on line 3—3 of Fig. 1 and showing the ray filter construction in plan;

Fig. 4 is an enlarged sectional detail of the pupilary distance locking construction;

Fig. 5 is a detail in plan of the slotted stop plate;

Fig. 6 is a horizontal section on line 6—6 of Fig. 1.

The instrument shown in Fig. 1 is a binocular prism telescope of the universal adjustment type, that is, the two eyepieces are simultaneously adjustable by a single operation for the purpose of focal adjustment, and, as is usual in instruments of this type, one eyepiece is also independently adjustable to compensate for any difference in the focal powers of the eyes of the user. The universal adjustment is effected by rotating the thumb wheel 1 and thereby the internally threaded sleeve 2 which coöperates with the axially movable screw 3. The axial movement of the screw 3 is imparted to the hinged universal adjusting arms 4 and 5 which carry the respective eyepieces.

The eyepiece on the right of Fig. 1 is also constructed for secondary or independent adjustment. The eyepiece lens holder 6 is a tubular member and bears internally of a guide tube 7 secured by threads in the binocular case. In the universal adjusting arm 5 is secured by a lock ring 8, a tubular standard 9 provided internally with a spiral thread. A threaded adjusting sleeve 10 coöperates with the threads of the tubular standard 9, and has a swivel or floating connection with the eyepiece lens holder 6. In the illustrated construction, the adjustment sleeve 10 has a portion of restricted diameter extending above the guide tube 7, and this restricted portion floats between a shoulder 11 of the draw tube portion of the eyepiece lens holder and an overhanging collar of the eye lens mounting 12 secured by threads in the upper end of the draw tube. The shoulder and collar are spaced apart a sufficient distance to allow the coöperating portion of the adjustment sleeve to work freely between them. An accuracy of about two thousandths of an inch is sufficient to insure proper operation. The longitudinal surfaces between the shoulder and the ring need not be fine finished as there is a clearance between the lens holder and the adjustment sleeve.

The diopter ring 13 is slipped over the adjustment sleeve externally of the tubular standard 9 and is secured to the adjustment ring by means of screws 14. As the drilling and tapping for the screws 14 is done after assembly, the adjustment ring may be placed in proper position with respect to the zero line when the instrument is adjusted to infinity. The eyecap 15 is finally attached to the upper end of the adjustment sleeve 10 by screw threads, as shown.

The lens holder 6 has a guide connection with the guide tube 7 which permits the relative axial movement of the lens holder, but prevents rotative movement thereof, and therefore the adjustment of the eyepiece lenses cannot affect the collimation of the optical system. In the illustrated construction this guide connection consists of a lug 16 which is struck in from the guide tube 7 and fits in a longitudinal slot 17 milled into the external surface of the lens holder.

I also preferably provide a bearing tube 18 which is attached to the guide tube 7 and fits snugly inside of the tubular standard 9, serving as a bearing for the standard when the universal adjustment mechanism is operated. It will be observed that this construction serves very effectively to exclude moisture or dust from the interior of the casing, and that its manufacture is simplified and its costs reduced to a minimum by reason of the fact that the only finishing operation to be performed is on the bearing surface of the guide tube 7, which member insures a perfectly centered axial movement of the lens holder. The operation of the adjustment sleeve does not affect the accuracy of the movement of the lens holder since the two parts do not have a tight connection.

In instruments of the non-universal adjustment type, as illustrated in Fig. 2, the adjustment sleeve has threaded connection with the guide tube to effect the independent adjustment of the eyepiece. The eyepiece lens holder 6 bears internally of the guide tube 20, and the adjustment sleeve 19 has its threaded connection externally of the guide tube. The outward adjustment of the sleeve 19 and the parts carried thereby in this construction is limited by the co-action of a shoulder 21 on the outer surface of the adjustment sleeve and a shoulder 22 on the inner surface of the tubular stop member 23 secured to the guide tube 20 and disposed between the diopter ring 13 and the adjustment sleeve 19. This tubular stop member also serves to assist in the exclusion of moisture and foreign particles from the interior of the casing through the adjustable parts of the eyepiece. The adjustment sleeve 19 has a floating connection between two shoulders of the lens holder, as in the construction of Fig. 1, and rotation of the lens holder is prevented by the lug 16 and longitudinal slot 17, as in the previous construction.

In binocular instruments of the non-universal adjustment type, both eyepieces will have the independent adjustment, as illustrated in Fig. 2. In instruments of the universal adjustment type, however, only one eyepiece need have the independent adjustment. As illustrated in Fig. 1, the other eyepiece has no rotative parts, but the adjustment of the arm 4 carries the sleeve 24 with it and thus effects the axial adjustment of the lens holder 6 which bears internally of the guide tube 7.

If desired, a ray filter may be provided in the eye cap 15, as shown in Figs. 1 and 3. In such case the eyecap is made in two parts connected by screw-threads and having a recess 25 between them for the accommodation of the ray filter construction. The ray filter element consists of a screen 26 and mounting 27 which has a crank arm pivotally attached to the cap 15 by means of the pivot screw 28. The annular wall of the recess 25 is slotted at 29, and the outer end of the crank arm projects through this slot and is provided with gear teeth, as shown. Surrounding the cap 15 in the plane of the recess 25 is an operating ring 30 provided at one portion with internal gear teeth which engage the gear teeth on the outer end of the crank arm of the ray filter mounting. Since the operating member for the ray filter to swing it into and out of filtering position, as illustrated in the full lines and dotted lines, respectively, of Fig. 3, is a ring surrounding the eye cap, the user of the instrument has no difficulty in locating the operating member to actuate it in any rotative position of the eye cap. When the operating member is confined to the place of protrusion of the crank arm, it is manifest that it is often in an awkward position for operation by the user. The operating ring 30 is disposed between a shoulder 31 on the eye cap and the overhanging holder for the eye cap 32 which has a floating connection with the eye cap, as shown in Fig. 1.

The stop mechanism for limiting and determining the interaxial or pupilary distance, is illustrated in Figs. 4 and 5. The hollow axis member 33 is secured to the hinged arm 34, at its lower end and to the hinged arm 35 at its upper end, as appears from Figs. 1 and 4. The surrounding sleeve 36 is secured at its lower end to the hinged arm 37 and at its upper end to the hinged arm 38. On the under face of the hinged arms 34 and 37 and surrounding the downward extension of the axis member, is a locking plate 38 which is fixed to and moved with the hinged arm 37 and is provided with a slot 39, as shown particularly in Fig. 5. The coöperating stop member is a pin 40 carried by ring members disposed axially of the axis member 33 and in released position being adjustable rotatively thereof, while being arranged to be clamped to the axis member when properly adjusted. Provision is also made to adjust one of the rings axially of the axis member and thereby withdraw the stop member 40 from coöperative relation with its complementary stop member and return the same to such position. This expedient permits the lock to be released without disturbing the relative adjusted positions of the stops.

In the specific construction shown, an internal clamp-controlled ring 41 surrounds the axis member and is adapted to be clamped thereto by the clamp screw 42. The other ring is a stop carrying ring 43 surrounding the clamp-controlled ring 41, the pin 40 being carried thereby and extending upwardly through a suitably-shaped perforation in the ring 41. The pin 40 thus serves to lock the two rings together rotatively. The stop carrying ring 43 is, however, axially adjustable relative to the inner ring 41. The internal surface of the ring 43 is provided with two circumferential grooves, one above the other, and a convoluted spring 44 surrounds the ring 41, being located in a slot therein, and its projecting portions engage in one or the other of the slots in the inner face of the ring 43. When the two stop members are in coöperative relation, which is the position shown in full lines in Fig. 4, the spring 44 engages in the lower slot of the ring 43, and when it is desired to withdraw the pin 40 from the slot 39 without disturbing their adjusted relation, as for example, when placing the instrument in its case, the ring 43 is axially moved downward to the position shown in dotted lines in Fig. 4, in which position it is again resiliently held by the engagement of the spring 44 in the upper slot of the ring 43.

The means for securing the objective lens mounting to the binocular or objective casing 45 is illustrated in Figs. 1 and 6. One of the advantageous features of this construction is the elimination of the objective lens mounting adapter, the objective mounting and the adjusting members therefor being mounted directly into the casting of the objective casing.

The objective casing is provided near its objective end with an annular internal rib 46, and separated from this rib by a circumferential slot 47 is an internal circumferential bearing surface 48. The objective lens mounting 49 is a tubular member having a flange 50 at its upper end, and immediately below this flange the mounting is provided with an eccentric circumferential shoulder 51. Surrounding this eccentric shoulder and fitting within the bearing surface 48 is an eccentric adjusting ring 52. This adjusting ring is secured in place by a locking ring 53 which screws into the outer end of the objective casing and bears against the outer end of the adjusting ring, the inner end of which bears against the flange 50 and holds the flange against the outer face of the rib 46. The cover 54 is next put on and serves to hold the lock nut 53 against accidentally releasing, and finally the objective cap 55 is screwed on the outer screw threaded end of the mounting. The adjustment of the objective lens for the purpose of collimating the optical system is effected by rotatively adjusting the lens mounting in the eccentric ring, or by adjusting the eccentric ring in the bearing surface 48, or by a combination of both adjustments, or by turning the mounting and the eccentric ring together in the bearing surface 48.

The slot 47 in the casing is made sufficiently deep to accommodate the flange 50 without the flange contacting with the inner wall of the slot in the most eccentric position of adjustment of the lens mounting. Furthermore, the parts are so designed that there is ample clearance to permit the locking ring 53 to be screwed up tightly and rigidly clamp the parts in adjusted position.

It is obvious that various modifications may be made in the construction shown in the drawings and above particularly described, within the principle and scope of my invention.

I claim:

1. In a telescope, an eye piece construction comprising, in combination with a fixed member, a non-rotative guide tube carried by the fixed member, a threaded adjustment sleeve immediately surrounding the guide tube, a diopter ring secured to and surrounding the adjustment sleeve in spaced relation thereto, a non-rotative tubular member disposed between the diopter ring and the adjustment sleeve, the adjustment sleeve having threaded engagement with one of its adjacent members, and a tubular eye piece lens holder axially slidable internally of the guide tube and having a swivel or floating connection with the adjustment sleeve.

2. In a telescope, an eye piece construction comprising, in combination with a fixed member, a non-rotative guide tube carried by the fixed member, a threaded adjustment sleeve immediately surrounding the guide tube, a diopter ring secured to and surrounding the adjustment sleeve in spaced relation thereto, a non-rotative tubular member disposed between the diopter ring and the adjustment sleeve, the adjustment sleeve having threaded engagement with one of its adjacent members, and a tubular eye piece lens holder axially slidable internally of the guide tube and having a swivel or floating connection with the adjustment sleeve, and having a guide connection with the guide tube preventing relative rotation of the lens holder.

3. In a telescope, an eyepiece construction comprising, in combination with a fixed member, a guide tube carried by the fixed member, a tubular standard surrounding the guide tube in spaced relation therewith, a tubular eyepiece lens holder bearing internally of the guide tube and axially slidable relative to the guide tube and standard and having a guide connection with the guide tube preventing relative rotation of the lens holder, an adjustment sleeve disposed between the tubular standard and guide tube and having threaded connection with one of said members and having a swivel or floating connection with the eyepiece lens holder, and a diopter ring surrounding the tubular standard and secured to the adjustment sleeve.

4. In a binocular telescope of the universal adjustment type, an independently adjustable eyepiece construction comprising, in combination with the objective casing and universal adjusting arm, a guide tube secured to the objective casing, an axially slidable tubular eyepiece lens holder bearing internally of the guide tube, a tubular standard secured to the universal adjusting arm and surrounding the guide tube, and an adjustment sleeve disposed between the guide tube and tubular standard and having a threaded connection with one of said members and having a swivel or floating connection with the eyepiece lens holder.

5. In a binocular telescope of the universal adjustment type, an independently adjustable eyepiece construction comprising, in combination with the objective casing and universal adjusting arm, a guide tube secured to the objective casing, an axially slidable tubular eyepiece lens holder bearing internally of the guide tube and having a guide connection therewith preventing relative rotation of the lens holder, a tubular standard secured to the universal adjusting arm and surrounding the guide tube, an adjustment sleeve disposed between the guide tube and tubular standard and having a threaded connection with the tubular standard and having a swivel or floating connection with the eyepiece lens holder, and a diopter ring surrounding the tubular standard and secured to the adjustment sleeve.

6. In a binocular telescope of the universal adjustment type, an independently adjustable eyepiece construction comprising, in combination with the objective casing and universal adjusting arm, a guide tube secured to the objective casing, an axially slidable tubular eyepiece lens holder bearing internally of the guide tube and having a guide connection therewith preventing relative rotation of the lens holder, a tubular standard secured to the universal adjusting arm and surrounding the guide tube, an adjustment sleeve disposed between the guide tube and tubular standard and having a threaded connection with the tubular standard and having a swivel or floating connection with the eyepiece lens holder, a bearing tube for the tubular standard fitting closely therein below the adjustment sleeve and carried by the guide tube, an eye cap carried by the adjustment sleeve, and a diopter ring surrounding the tubular standard and secured to the adjustment sleeve.

7. In a telescope, in combination with an eyepiece construction including a rotative eye cap and an eyepiece lens holder and eyepiece lenses in the holder, a ray filter and a mounting therefor pivoted to swing the ray filter into and out of axial alinement with the eyepiece lenses, and an operating ring surrounding the eye cap and having operative connection with the ray filter mounting.

8. In a telescope, in combination with the objective casing and a non-rotative tubular standard carried thereby, an eyepiece lens holder, an adjustment sleeve carrying the eyepiece lens holder and having screw threaded engagement with the standard, an eye cap carried by the adjustment sleeve and having a recess therein, a ray filter and a mounting therefor pivoted in the recess to swing the ray filter into and out of axial alinement with the eyepiece lenses, and an operating ring surrounding the eye cap and having operative connection with the ray filter mounting.

9. In a telescope, a non-rotative eyepiece tubular standard, an eyepiece lens holder axially adjustable within the standard, a rotative adjustment sleeve carrying the lens holder and having screw threaded connection with the standard, an eyecap carried by the adjustment sleeve and having a recess therein, a ray filter and mounting therefor pivoted in the recess to swing the ray filter into and out of axial alinement with the eyepiece lenses, the outer end of the mounting extending externally of the eye cap and being provided with gear teeth, and an operating ring surrounding the eye cap and provided with internal gear teeth engaging those on the ray filter mounting.

10. In combination with the hinged arms of a binocular telescope, a pupilary distance locking device comprising an axis member secured to one of the arms, a stop element carried by the other arm, a coöperative stop-carrying member supported on the axis member and adjustable axially thereof to bring the two stops into and out of coöperative relation, and means for resiliently holding the stop-carrying member in either of its two positions.

11. In combination with the hinged arms of a binocular telescope, a pupilary distance locking device comprising an axis member secured to one of the arms, a stop element secured to the other arm, a rotatively adjustable coöperative stop-carrying ring axially disposed on the axis member and adapted to be moved axially into and out of coöperative relation with the first stop element, clamping means for rotatively securing the said ring to the axis member, and means for resiliently holding the ring in either of its two axially adjusted positions.

12. In combination with the hinged arms of a binocular telescope, a pupilary distance locking device comprising an axis member secured to one of the arms, a slotted plate secured to the other arm, a rotatively adjustable stop-carrying ring axially disposed on the axis member, a stop pin carried by the ring and axially adjustable into and out of coöperative relation with the slot in the plate, and spring means for resiliently holding the pin in either of its two axially adjusted positions.

13. In combination with the hinged arms of a binocular telescope, a pupilary distance locking device comprising an axis member secured to one of the arms, a slotted plate secured to the other arm, a rotatively adjustable clamp controlled ring axially disposed on the axis member and having a stop-receiving perforation therein, an axially-adjustable stop-carrying ring surrounding the clamp controlled ring and having a stop pin disposed in the perforation in the clamp controlled ring and adapted to be carried by the stop-carrying ring into and out of coöperative relation with the slot in the plate, spring means resiliently holding the stop carrying ring in either of its two axially adjusted positions, and clamping means for rotatively securing the clamp controlled ring to the axis member.

14. In a telescope, an objective casing provided at the objective end with an internal circumferential bearing portion, a tubular objective lens mounting including a circumferential eccentric portion arranged in the objective end of the objective casing with its eccentric portion within the said bearing portion, and means for securing the lens mounting in said position.

15. In a telescope, an objective casing provided at the objective end with an internal circumferential bearing portion, an eccentric adjusting ring fitting within said bearing portion, a tubular objective lens mounting fitting within said adjusting ring, and means for securing the said parts in said position.

16. In a telescope, an objective casing provided at the objective end with an internal circumferential bearing portion, an eccentric adjusting ring fitting within said bearing portion, a tubular objective lens mounting having a circumferential eccentric shoulder fitting within the adjusting ring, and means for securing the ring and mounting in said position.

17. In a telescope, an objective casing provided at the objective end with an internal annular shoulder and an internal circumferential bearing portion, an eccentric bearing ring fitting within the bearing portion, a tubular objective lens mounting disposed within the casing and having at its inner end a circumferential flange arranged between the adjusting ring and the shoulder of the casing and having a circumferential eccentric shoulder fitting within the adjusting ring, and a locking ring for securing the adjusting ring in said position.

In witness whereof, I subscribe my signature.

ARNO GREINER.